United States Patent
Yuan et al.

(10) Patent No.: US 12,329,126 B1
(45) Date of Patent: Jun. 17, 2025

(54) ELECTRONIC FENCE BASED ON POSITIONING ASSEMBLY

(71) Applicant: Shenzhen Wellturn Technology Co., Ltd., Shenzhen (CN)

(72) Inventors: Xiai Yuan, Shenzhen (CN); Xingsheng Luo, Shenzhen (CN)

(73) Assignee: Shenzhen Wellturn Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/000,589

(22) Filed: Dec. 23, 2024

(51) Int. Cl.
*A01K 15/02* (2006.01)
*A01K 11/00* (2006.01)
*G01S 5/02* (2010.01)

(52) U.S. Cl.
CPC .......... *A01K 15/023* (2013.01); *A01K 11/008* (2013.01); *A01K 15/022* (2013.01); *G01S 5/0295* (2020.05)

(58) Field of Classification Search
CPC .. A01K 15/023; A01K 15/022; A01K 15/021; A01K 27/009; A01K 11/008; G01S 5/0295
See application file for complete search history.

(56) References Cited

U.S. PATENT DOCUMENTS

| | | | | |
|---|---|---|---|---|
| 6,271,757 B1* | 8/2001 | Touchton | ............. | A01K 15/023 119/908 |
| 7,559,291 B2* | 7/2009 | Reinhart | ............. | A01K 15/021 340/573.3 |
| 2004/0108939 A1* | 6/2004 | Giunta | ............. | A01K 15/023 340/572.1 |
| 2005/0139168 A1* | 6/2005 | Light | ............. | A01K 15/021 119/721 |
| 2005/0200487 A1* | 9/2005 | O'Donnell | ......... | G08B 21/0227 340/573.1 |
| 2006/0197672 A1* | 9/2006 | Talamas | ............. | G08B 21/22 340/573.3 |
| 2008/0245316 A1* | 10/2008 | Peinetti | ............. | A01K 15/023 119/719 |
| 2008/0272920 A1* | 11/2008 | Brown | ............. | G08B 13/1427 340/573.3 |
| 2012/0000431 A1* | 1/2012 | Khoshkish | ............ | A01K 15/023 119/720 |
| 2016/0015004 A1* | 1/2016 | Bonge, Jr. | ............. | G08C 17/02 119/718 |
| 2016/0021506 A1* | 1/2016 | Bonge, Jr. | ............. | G16H 40/67 717/173 |

* cited by examiner

*Primary Examiner* — Yvonne R Abbott-Lewis

(57) ABSTRACT

A wireless electronic fence is worn on a pet and includes: a positioning assembly, a signal detection assembly, a warning assembly, and a master control circuit. The positioning assembly receives a first signal sent by an external terminal, determines a position of the positioning assembly based on the first signal; and outputs a position detection signal. The signal detection assembly detects a signal strength of the first signal and outputs a signal strength detection signal. The master control circuit receives the signal strength detection signal; compares the signal strength of the first signal carried in the signal strength detection signal with a preset signal strength to produce a comparison result; and controls the warning assembly to operate or to stop operating according to the comparison result.

19 Claims, 13 Drawing Sheets

ELECTRONIC FENCE BASED ON POSITIONING ASSEMBLY

TECHNICAL FIELD

Embodiments of the present disclosure relate to the technical field of pets, and more specifically, to an electronic fence based on a positioning assembly.

BACKGROUND

Many families have pets, and pets, when being not trained, may follow their nature to do things against the owner. For example, a dog may run away from the owner after being unleashed, and it is difficult to find the dog.

In the art, a location of the pet is obtained by the wireless distance measurement technology. When the pet leaves a preset region, the pet may be punished. However, a method of determining punishment is not accurate. For example, when wireless signals are interfered, the method in the art may incorrectly punish the pet.

SUMMARY

The present disclosure provides a wireless electronic fence, configured to be worn on a pet. The wireless electronic fence includes: a positioning assembly, a signal detection assembly, a warning assembly, and a master control circuit. The positioning assembly is configured to: receive a first signal sent by an external terminal, determine a position of the positioning assembly based on the first signal; and output a position detection signal carrying the position. The signal detection assembly is electrically connected to the positioning assembly and configured to detect a signal strength of the first signal and output a signal strength detection signal, wherein the signal strength detection signal carries the signal strength of the first signal. The master control circuit is electrically connected to the positioning assembly, the signal detection assembly and the warning assembly and configured to: receive the signal strength detection signal; compare the signal strength of the first signal carried in the signal strength detection signal with a preset signal strength to produce a comparison result; and control the warning assembly to operate or to stop operating according to the comparison result.

DETAILED DESCRIPTIONS

Technical solutions of the present disclosure will be described clearly and completely in the following by referring the accompanying drawings in embodiments of the present disclosure, and it is clear that the described embodiments are only a part of, not all of, the embodiments of the present disclosure. All other embodiments, which are obtained by any ordinary skilled person in the art based on the embodiments in the present disclosure without making creative work, shall fall within the scope of the present disclosure.

In the present disclosure, unless otherwise expressly provided and limited, terms "connect", "fix", and so on shall be broadly interpreted. For example, "fix" may be fixed connection, detachable connection, or integrally formed; or may be mechanical connection or electrical connection; direct connection or indirect connection through an intermediate medium; or internally connection within two elements or interaction between two elements, unless expressly limited otherwise. Any ordinary skilled person in the art shall understand the specific meanings of the above terms in the present disclosure case by case.

Terms "first" and "second" in the present disclosure are used only for descriptive purposes and shall not be interpreted as indicating or implying relative importance or implicitly specifying the number of technical features indicated. Therefore, a feature defined as "first" or "second" may include at least one such feature, either explicitly or implicitly. In addition, the technical solutions of various embodiments may be combined with each other, but must be able to be achieved any ordinary skilled person in the art, and when combination of technical solutions is contradictory or unattainable, it should be considered that the combination of technical solutions does not exist, and is not within the scope of the claims of the present disclosure.

Figure 1:
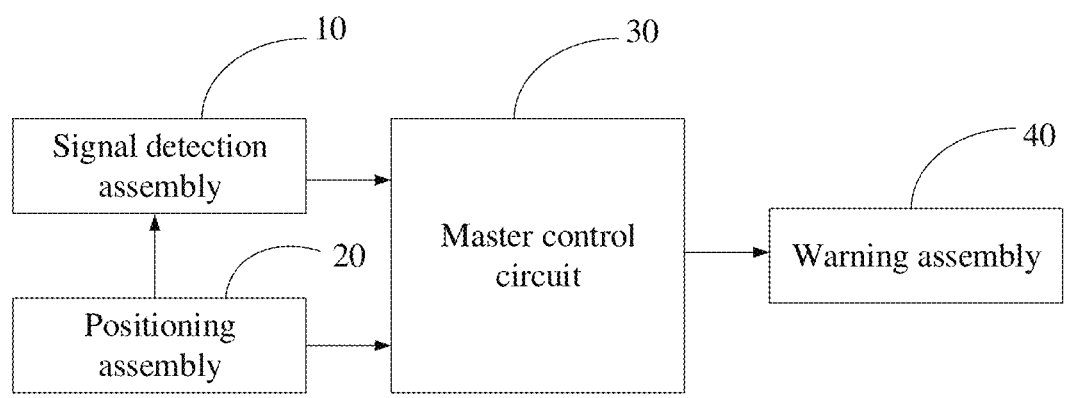
FIG. 1 is a structural schematic view diagram of an electronic fence based on a positioning assembly according to an embodiment of the present disclosure.

As shown in FIG. 1, the present disclosure provides an electronic fence based on a positioning assembly that can be worn on a pet. The electronic fence includes a positioning assembly 20, a signal detection assembly 10, a warning assembly 40, and a master control circuit 30.

The positioning component 20 is configured to access a first signal from an external terminal, determine a position of the positioning component 20 based on the first signal, and output a position detection signal carrying the determined position. The signal detection assembly 10 is electrically connected to the positioning assembly 20 to detect signal strength of the first signal and output a corresponding signal-strength detection signal. The signal-strength detection signal carries the signal strength of the first signal. The master control circuit 30 is electrically connected to the warning assembly 40, the positioning assembly 20, and the signal detection assembly 10. The master control circuit 30 is configured to receive the signal-strength detection signal, compare the signal strength of the first signal carried in the signal-strength detection signal with a preset signal strength to generate a comparison result, and control the warning assembly 40 to be in an operating state or in a stop-operating state according to the comparison result.

In an embodiment, the positioning assembly 20 may determine the position of the electronic fence by receiving navigation satellite signals. The positioning assembly 20 may receive navigation signals sent from satellite systems such as GPS, BDS, GLONASS, GALILEO or QZSS to determine the position of the positioning assembly 20. To be noted that the position of the positioning assembly 20 is the position of the electronic fence. When in use, the position of the electronic fence indicates a location of the pet carrying the electronic fence. The positioning assembly 20 may be a GPS positioning module 210110, a GLONASS positioning module or a BDS positioning module 10, and so on. The navigation satellite is the external terminal, the navigation signal sent from the navigation satellite is the first signal, and the navigation signal includes a navigation message. The positioning assembly 20 determines the position of the positioning assembly 20 based on the first signal and outputs a corresponding position detection signal. The position detection signal may be a latitude-longitude position of the positioning assembly 20. The master control circuit 30 compares the position detection signal with a preset position range information to determine whether the position of the electronic fence is located within a present position range. The preset position range information may be set by a user, which may be the owner of the pet or another human who limits a movement range of the pet. The preset position range information may be determined based on a series of latitude-longitude information; the preset position range determined by the series of latitude-longitude information may be triangular, quadrilateral, pentagonally circular, or in other shapes.

In an embodiment, the positioning assembly 20 may determine the location of the electronic fence based on wireless positioning. Specifically, the positioning assembly 20 may receive and measure signal strengths of signals emitted from a plurality of transmitters. The positioning assembly 20 determines a relative position of the electronic fence with respect to the plurality of transmitters based on the signal strength of each received signal. The positioning assembly 20 determines the position of the electronic fence based on a position of each of the plurality of transmitters. The positioning assembly 20 may be a wireless positioning module, and the wireless positioning module may be positioned based on the signal strength of each signal received from each of the plurality of transmitters. Alternatively, the wireless positioning module may be positioned based on a signal angle of each signal received from each of the plurality of transmitters. Alternatively, the wireless positioning module may be positioned based on a time-of-arrival method. Alternatively, the wireless positioning module may be positioned based on a time difference of arrival. In the present embodiment, each of the plurality of transmitters may be the external terminal as described above. The signal emitted from each of the plurality of transmitters is the first signal, and the position detection signal represents the position of the electronic fence The positioning assembly 20 compares the position carried in the position detection signal with the preset position range to determine whether the position of the electronic fence is located within the preset position range. The preset position range may be set by the owner of the pet. For example, the preset position range may be set by the owner of the pet on an electronic map displaying the location of the electronic fence. The present disclosure does not limit a method of determining the preset position range.

In an embodiment, the positioning assembly 20 may perform distance measurement based on a signal strength of the wireless signal to determine a distance between the positioning assembly 20 and each transmitter (such as the external terminal). The transmitter may transmit a Bluetooth signal or a Wi-Fi signal. The positioning assembly 20 measures the signal strength of the wireless signal emitted sent from the transmitter to determine the distance between the electronic fence and the transmitter. The positioning assembly 20 may be a wireless signal strength measurement and positioning module. The transmitter may be used by the owner of the pet, representing a location of the owner of the pet. For example, the first signal described above is the wireless signal emitted from the transmitter. The position detection signal is the signal strength of the wireless signal, and the master control circuit 30, after obtaining the position detection signal, compares the position detection signal with a signal strength preset value. When the signal strength of the wireless signal is greater than or equal to the signal strength preset value, it is determined that the electronic fence is located within the preset position range. When the signal strength of the wireless signal is less than the signal strength preset value, it is determined that the electronic fence is located outside the preset position range. The signal strength preset value may be set by the owner of the pet. In another example, the first signal may be represented as a distance value corresponding to the signal. In this case, the master control circuit 30 compares the distance value with a preset distance value. The preset distance value is a radius of a circle taking the transmitter as a center. When the distance value corresponding to the first signal is less than or equal to the preset distance value, it is determined that the electronic fence is located within the preset position range. When the distance value corresponding to the first signal is greater than the preset distance value, it is determined that the electronic fence is outside the preset position range.

To be noted that whether or not the positioning assembly 20 can obtain the first signal from the external terminal and a signal quality of the obtained first signal are related to the signal strength at the electronic fence. Specifically, in a process of the positioning assembly 20 determining the position of the positioning assembly 20 based on the navigation signals from the navigation satellites, the signal strength and a signal-to-noise ratio of the navigation signal affect accuracy of the positioning assembly 20 in determining the position of the positioning assembly 20 based on the navigation signals. When the signal strength of the navigation signal is weak, an error in determining the position of the positioning assembly 20 is large, normal usage of the electronic fence is affected. Furthermore, in a process of the positioning assembly 20 determining the position of the positioning assembly 20 based on the signals from a plurality of wireless signal sources, when a signal strength of at least one of the wireless signals received from the plurality of wireless signal sources is weak, an error of the positioning assembly 20 in determining the position of the positioning assembly 20 is large. The error may be caused by an object blocking signal propagation or an object reflecting the signal. In addition, Alternatively, in a process of the positioning assembly 20 determining the position of the positioning assembly 20 based on the signal strength of the wireless signal of each transmitter, when the signal strength of any signal that is sent from any one of the plurality of transmitters and received by the positioning assembly 20 is small, an error in the determination of the position by the positioning assembly 20 is large. The error may be caused by a terrain blocking propagation of the signal.

In order to ensure accuracy of the position determined by the positioning assembly 20, the signal detection assembly 10 is configured to detect the signal strength of the first signal and output the signal strength detection signal carrying the signal strength of the first signal to the master control circuit 30. The master control circuit 30 controls the warning assembly 40 to operate or stop operating according to the position detection signal when the signal strength carried in the signal strength detection signal is greater than or equal to the preset signal strength. When the position of the electronic fence indicated by the position detection signal is located within the preset position range, the master control circuit 30 controls the warning assembly 40 to operate. When the position of the electronic fence indicated by the position detection signal is outside the preset position range, the master control circuit 30 controls the warning assembly 40 to stop operating. It is to be noted that the signal strength of the first signal determines the accuracy of the positioning assembly 20 in determining the position. When the signal strength of the first signal is stronger, a signal strength value of the signal strength detection signal is greater. The master control circuit 30 controls the warning assembly 40 to stop operating when the signal strength value of the signal strength detection signal is less than a preset signal strength value. The signal detection assembly 10 may be an RSSI detection circuit 110, the RSSI detection circuit 110 detects a voltage value of the first signal to determine the signal strength of the first signal and to output the corresponding signal strength detection signal. When the voltage value of the first signal is greater, it is indicated that the signal strength of the first signal is stronger, and therefore, the first signal value of the signal strength detection signal is greater. The signal strength detection signal may be an analog signal, and the signal strength detection signal may be a current of 4 mA-20 mA or a voltage of 1V-5V, or a current in other ranges or a voltage in other ranges. Correspondingly, the preset signal strength may be any value in a value range of the signal strength detection signal. The preset signal strength can be set by the owner of the pet or a manufacturer of the electronic fence. The signal strength detection signal may be a digital signal, a value of the signal strength detection signal may be a value within a certain range, and the value of the preset signal strength may be any value in the range.

The master control circuit 30 may include an MCU, a Digital Signal Process (DSP), a PLC, a system on chip (SOC), and so on.

In summary, the master control circuit 30 receives the position detection signal and the signal strength detection signal. The master control circuit 30 firstly determines whether the signal strength of the first signal carried in the signal strength detection signal is greater than or equal to the preset signal strength to determine whether the position of the electronic fence represented by the first signal can be determined accurately. Only when the signal strength of the first signal carried in the strength detection signal is greater than or equal to the preset signal strength, the master control circuit further determines whether or not the position carried in the position detection signal is located within the preset position range to determine whether or not the warning assembly 40 can operate or stop operating. In this way, a wrongly warning to the pet, caused by the location signal being not strong sufficiently, can be avoided.

Figure 2:
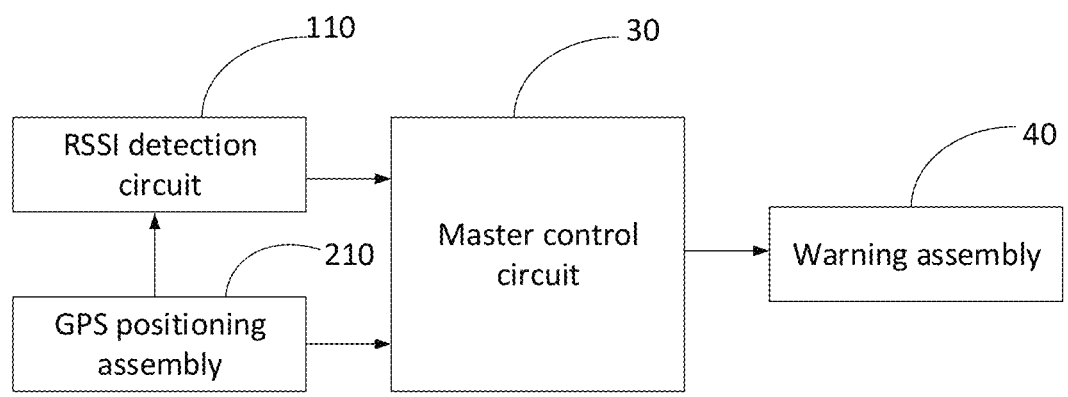
FIG. 2 is a structural schematic view diagram of the electronic fence based on the positioning assembly according to another embodiment of the present disclosure.

As shown in FIG. 2, in an embodiment, the positioning assembly 20 includes the GPS positioning module 210; or the wireless positioning module; or the wireless signal strength measurement and positioning module. The signal detection assembly 10 includes the RSSI detection circuit.

Figure 3:
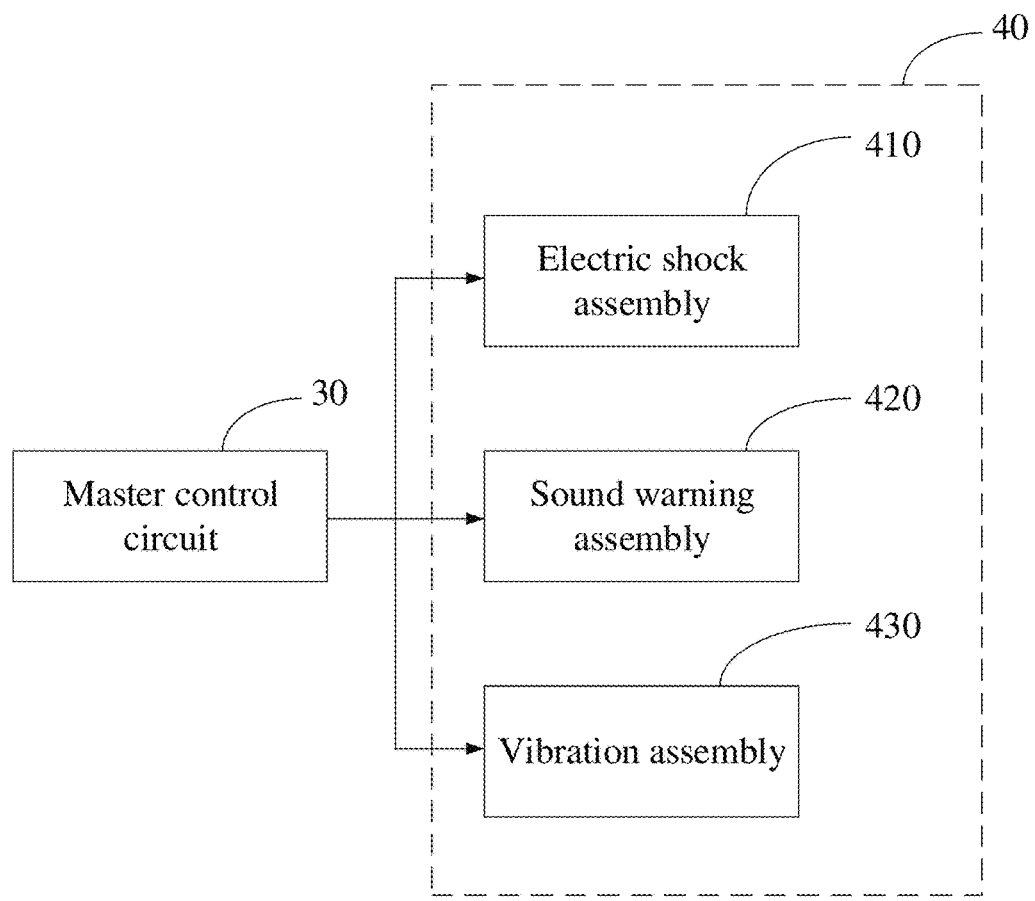
FIG. 3 is a structural schematic view diagram of the electronic fence based the positioning assembly according to still another embodiment of the present disclosure.

As shown in FIG. 3, in an embodiment, the warning assembly 40 includes at least one of: an electric shock assembly 410, a sound warning assembly 420, and a vibration assembly 430. The electric shock assembly 410 is electrically coupled to the master control circuit 30. The electric shock assembly 410 may include a high voltage generator or a voltage booster. The electric shock assembly 410 generates an electric shock or stop operating when the master control circuit 30 controls the warning assembly 40 to operate or stop operating. The sound warning assembly 420 is electrically connected to the master control circuit 30, and the sound warning assembly 420 produces a warning sound or stops operating when the master control circuit 30 controls the warning assembly 40 to operate or stop operating. The sound assembly 420 may emit sound waves that are not preferred by the pet. For example, in order to avoid the sound emitted by the sound warning assembly 420 from affecting humans, the sound warning assembly 420 may be an ultrasonic assembly. The vibration assembly 430 is electrically connected to the master control circuit 30, and when the master control circuit 30 controls the warning assembly 40 to operate or stop operating, the vibration assembly 430 emits vibration or stops operating. For example, the vibration assembly 430 may be a vibration motor. Further, when the warning assembly 40 includes more than one of: the electric shock assembly 410, the sound warning assembly 420, and the vibration assembly 430, the master control circuit 30 may control any one of the electric shock assembly 410, the sound warning assembly 420, and the vibration assembly 430 to operate alone, or to control two or three of the electric shock assembly 410, the sound warning assembly 420, and the vibration assembly 430 to operate cooperatively.

In an application scenario, the pet may need to move out of the preset position range due to special situations. Due to under the special situations, the owner does not wish to give any warning to the pet. Therefore, the electronic fence in the present disclosure is further arranged with a situation determination module connected to the master control circuit. The situation determination module is configured to determine the situation which is confronted by the pet, generate a situation signal and send the situation signal to the master control circuit.

Figure 4:
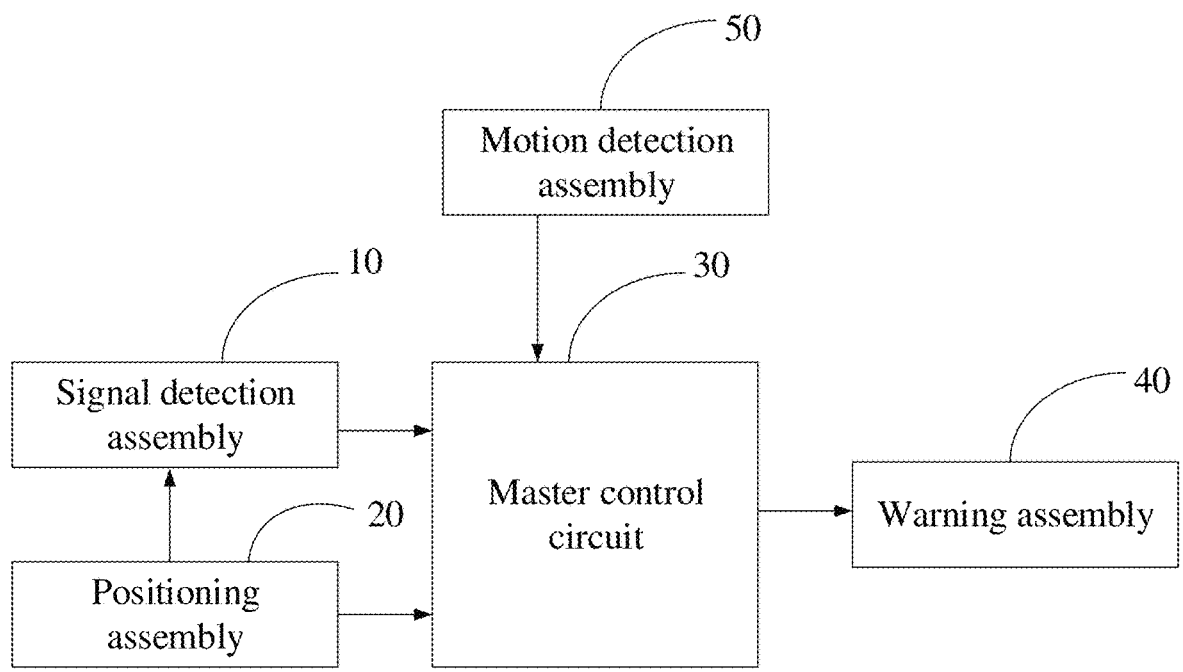
FIG. 4 is a structural schematic view diagram of the electronic fence based the positioning assembly according to still another embodiment of the present disclosure.
Figure 5:
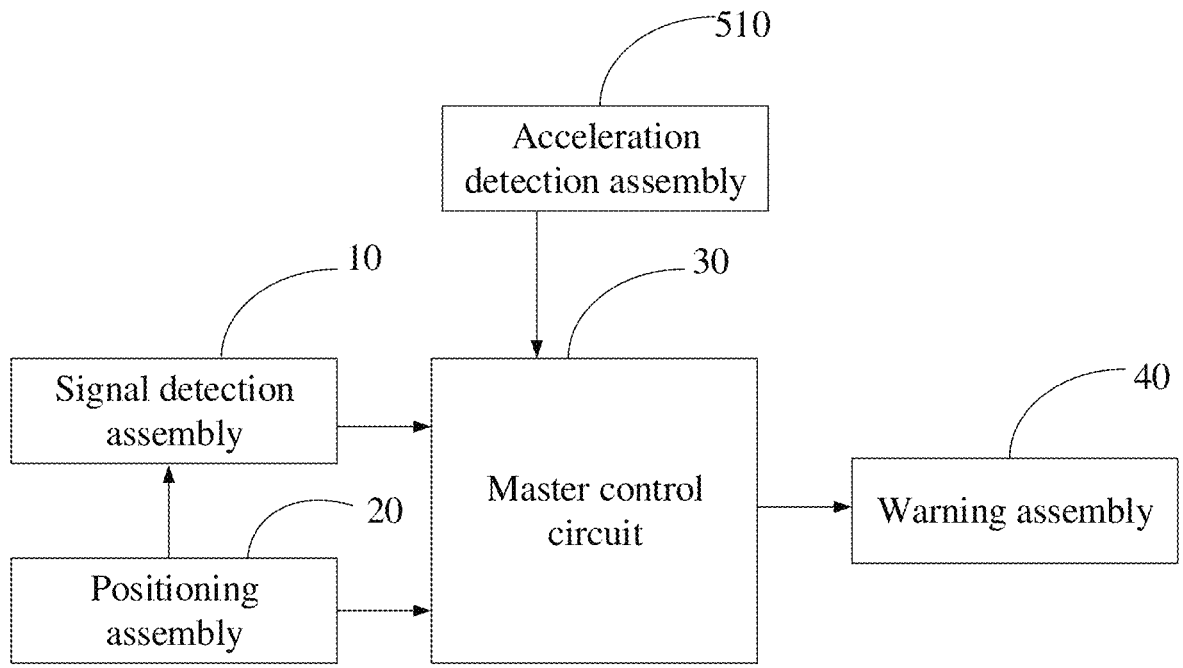
FIG. 5 is a structural schematic view diagram of the electronic fence based the positioning assembly according to still another embodiment of the present disclosure.

In an embodiment, as shown in FIGS. 4 and 5, the electronic fence is arranged with a motion detection assembly 50 as the situation determination module. The motion detection assembly 50 is electrically connected to the master control circuit 30. The motion detection assembly 50 is used to detect a motion state of the pet and output a motion detection signal carrying the motion state to the master control circuit 30.

The master control circuit 30 controls the warning assembly to operate or stop operating according to the signal strength detection signal, the position detection signal and the motion detection signal. Specifically, the master control circuit firstly detects the signal strength detection signal, and when the signal strength of the first signal carried in the signal strength detection signal is greater than or equal to the present signal strength, the master control circuit controls the warning assembly 40 to operate or stop operating according to the motion detection signal and the position detection signal.

In an embodiment, the motion detection assembly 50 includes: an acceleration detection assembly 510 (such as an acceleration sensor), an inertial sensor, and so on. The motion detection assembly 50 detects motion data of the pet and generates the motion detection signal. An acceleration signal-posture mapping table and a preset warning posture table are pre-stored in the electronic fence. The master control circuit 30 may determine a current posture of the pet based on the received motion detection signal and the mapping table, and compare the current posture with the preset warning posture table. When the current posture matches any posture in the preset warning posture table and the position detection signal indicates that the position is located outside the preset position range, the master control circuit 30 controls the warning assembly 40 to operate. When the current posture does not match any posture in the preset warning posture table and the position detection signal indicates that the position is located outside the preset position range, the master control circuit 30 controls the warning assembly 40 to stop operating. When the position detection signal indicates that the position is located within the preset position range, the master control circuit 30 controls the warning assembly 40 to stop operating regardless of any current posture. The present warning posture table may not include a stationary posture.

Figure 6:
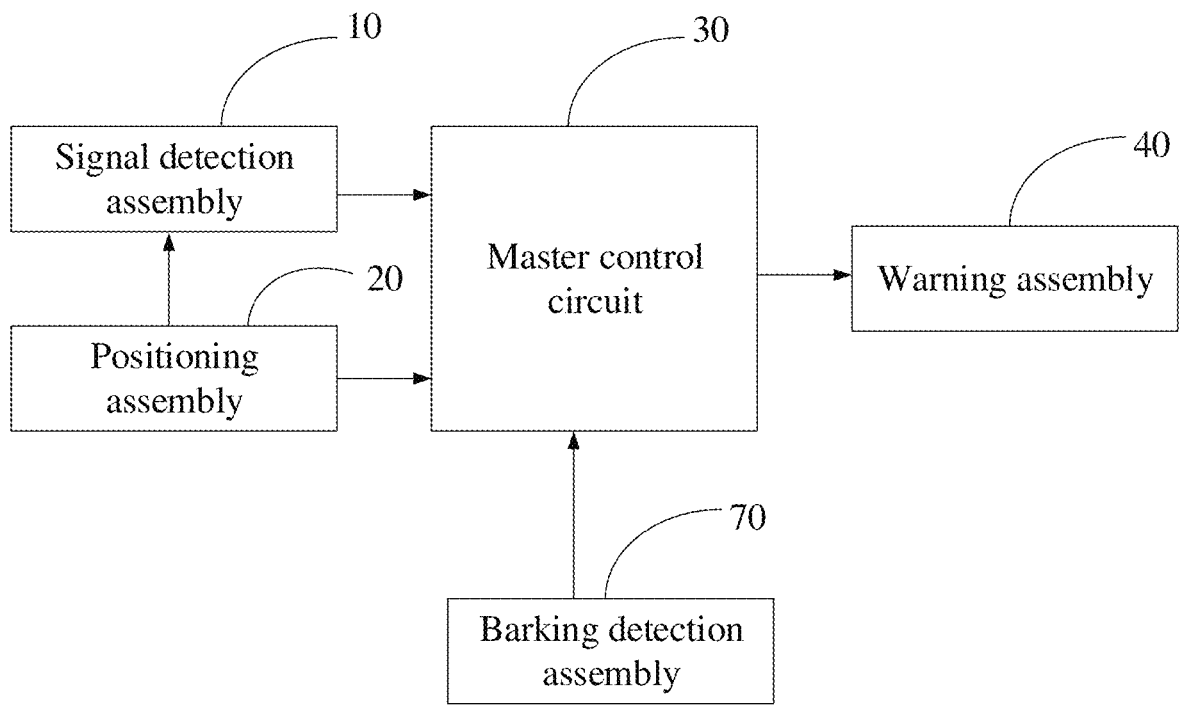
FIG. 6 is a structural schematic view diagram of the electronic fence based the positioning assembly according to still another embodiment of the present disclosure.

In an embodiment, as shown in FIG. 6, the electronic fence is arranged with a barking detection assembly 70 as the situation determination module. The barking detection assembly 70 is electrically connected to the master control circuit 30. The barking detection component 70 is configured to output a barking detection signal to the master control circuit 30 when a pet is detected to be barking. The master control circuit 30 controls the warning assembly 40 to operate or stop operating based on the signal strength detection signal, the position detection signal, and the barking detection signal.

Specifically, the barking detection assembly 70 may be a sound sensor or a vibration sensor, and so on, disposed at a vocal organ of the pet and configured to detect vibration of the vocal organ. The barking detection assembly 70 is configured to output the corresponding barking detection signal to the master control circuit 30 when detecting barking from the pet. The barking detection signal may be an analog signal or a digital signal.

It is to be understood that when a special situation occurs, an animal emits sound to transmit a signal to express an alert, a warning or a threat. For example, a dog may bark furiously to express a warning when seeing a thief or a robber. Therefore, when the pet is in the special situation, the pet may emit a barking at a high amplitude and a large number of barks. The barking detection component 70 may detect a barking amplitude and the number of barks of the pet. The generated barking detection signal carries information related to the barking amplitude and the number of barks, so as to determine whether the pet is in the special situation.

The master control circuit 30 firstly determines the signal strength of the first signal. When it is determined that the signal strength of the first signal is greater than the preset signal strength, the master control circuit 30 compares the position detection signal with the preset position range. When the position of the electronic fence (i.e., the pet) is located outside the preset position range, the master control circuit 30 compares the barking amplitude in the barking detection signal with a preset amplitude, and when the barking amplitude is greater than the preset amplitude, the number of barks in the barking detection signal is detected. When the number of barks is less than a preset number, the warning assembly 40 is controlled to operate. When the number of barks is greater than or equal to the preset number, the warning assembly 40 is controlled to stop operating. When the position of the electronic fence is located within the preset position range, the warning assembly 40 is controlled to stop operating regardless of any comparison result between the barking amplitude and the preset amplitude or between the number of barks with the preset number.

Figure 7:
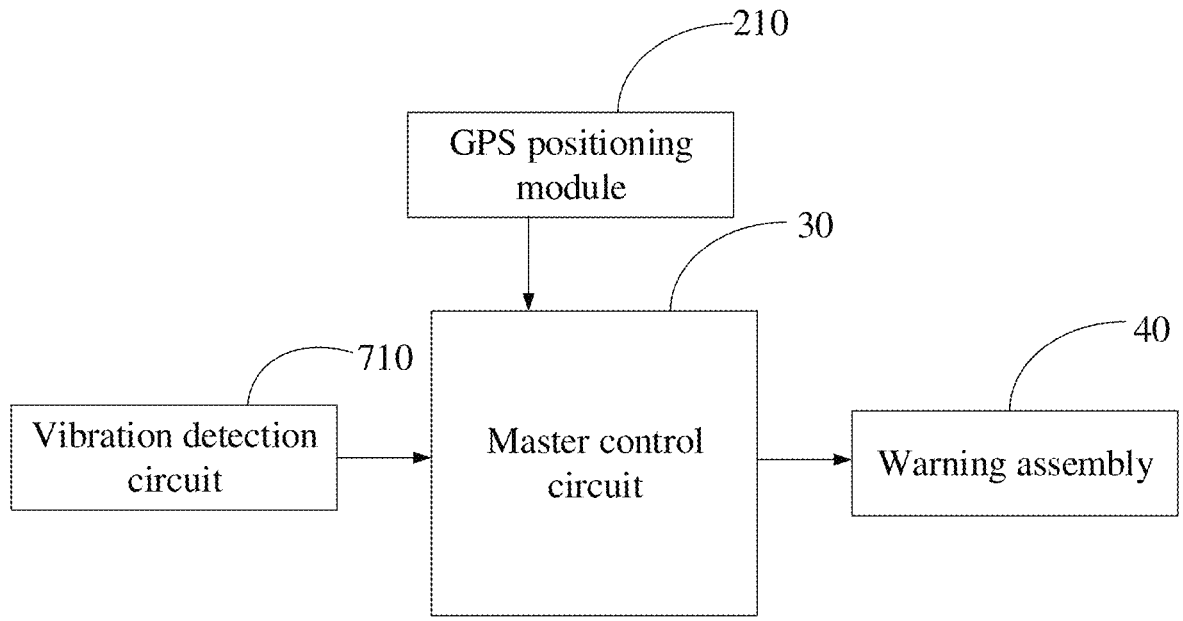
FIG. 7 is a structural schematic view diagram of an electronic fence according to an embodiment of the present disclosure.

Specifically, in an embodiment, as shown in FIG. 7, the barking detection assembly 70 includes: a vibration detection circuit 710. The vibration detection circuit 710 is electrically connected to the master control circuit 30 to output the corresponding barking detection signal to the master control circuit 30 when vibration of the vocal organ of the pet is detected. The vibration detection circuit 710 includes a force sensor, an electrically operated speed sensor, a piezoelectric acceleration sensor, or an eddy-current type displacement sensor, or other vibration sensors. The vibration detection circuit 710 may be in contact with the vocal organ of the pet for detecting the vibration of the vocal organ. For example, the vibration detection circuit 710 is in contact with a vocal cord of the dog to detect vibration of the vocal cord.

In the present embodiment, the barking detection signal output by the vibration detection circuit 710 is the analog signal. The vibration detection circuit 710 may include an analog vibration sensor, and the analog vibration sensor is configured to output the corresponding barking detection signal to the master control circuit 30 when the vibration of the vocal organ of the pet is detected. The barking detection signal may be a current of 4 mA-20 mA or a voltage of 1V-5V or other analog signals.

In an embodiment, the barking detection signal output by the vibration detection circuit 710 is a digital signal. The vibration detection circuit 710 may take a digital vibration sensor to output the barking detection signal, which is the digital signal. The vibration detection circuit 710 may alternatively take an analog-to-digital conversion circuit to convert the barking detection signal output by an analog vibration sensor arranged in the vibration detection circuit 710 into the digital signal and then output the digital signal.

Figure 8:
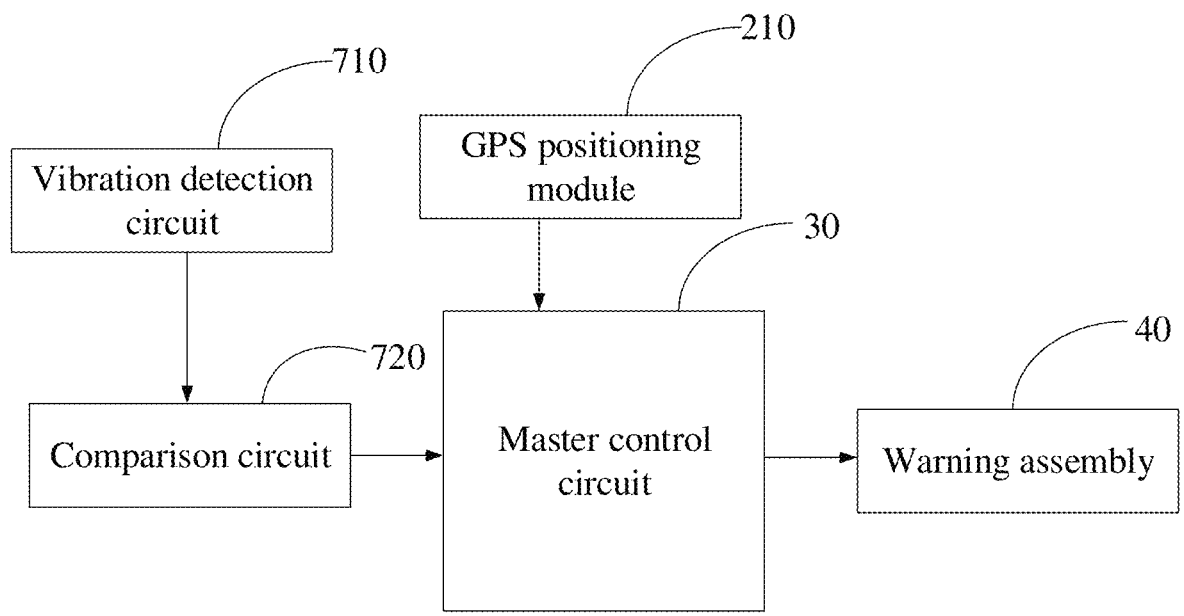
FIG. 8 is a structural schematic view diagram of the electronic fence according to another embodiment of the present disclosure.

As shown in FIG. 8, in an embodiment, the barking detection assembly 70 further includes: a comparison circuit 720. An input end of the comparison circuit 720 is electrically connected to an output end of the vibration detection circuit 710; and an output end of the comparison circuit 720 is electrically connected to the master control circuit 30. The comparison circuit 720 is configured to compare an amplitude of the detected signal output by the vibration detection circuit 710 and a preset amplitude. When the amplitude of the detected signal is greater than the preset amplitude, the comparison circuit 720 outputs the barking detection signal to the master control circuit 30.

In the present embodiment, the signal output by the vibration detection circuit 710 is the analog signal. In an embodiment, the detection signal output by the vibration detection circuit 710 is analog vibration amplitude. The comparison circuit 720 may be a voltage comparator or a window comparator. The preset amplitude may be provided by a voltage source or by the master control circuit 30. The master control circuit 30 may include an MCU, a DSP, an FPGA, a PLC, a SOC, and the like. The preset amplitude can be set by the owner of the pet or the manufacturer of the electronic fence. The comparison circuit 720 is configured to compare the amplitude of the vibration detection signal output by the vibration detection circuit 710 and the preset amplitude. When the amplitude of the detection signal is greater than the preset amplitude, the comparison circuit 720 outputs the barking detection signal to the master control circuit 30. Furthermore, the master control circuit 30 may count the barking detection signal. It can be easily understood that the amplitude of the barking detection signal that is counted by the master control circuit 30 is greater than the preset amplitude. In another embodiment, the vibration detection circuit 710 includes an analog-to-digital conversion circuit, and the detection signal output by the vibration detection circuit 710 is the digital signal. In the present embodiment, the barking detection assembly 70 further includes a second master controller 310, the second master controller 310 is electrically connected to the output end of the vibration detection circuit 710 to compare the detection signal output by the vibration detection circuit 710 with a preset value. When the detection signal is greater than the preset value, the second master controller 310 outputs the barking detection signal to the master control circuit 30. The preset value may be set by the owner of the pet or the manufacturer of the electronic fence.

Figure 9:
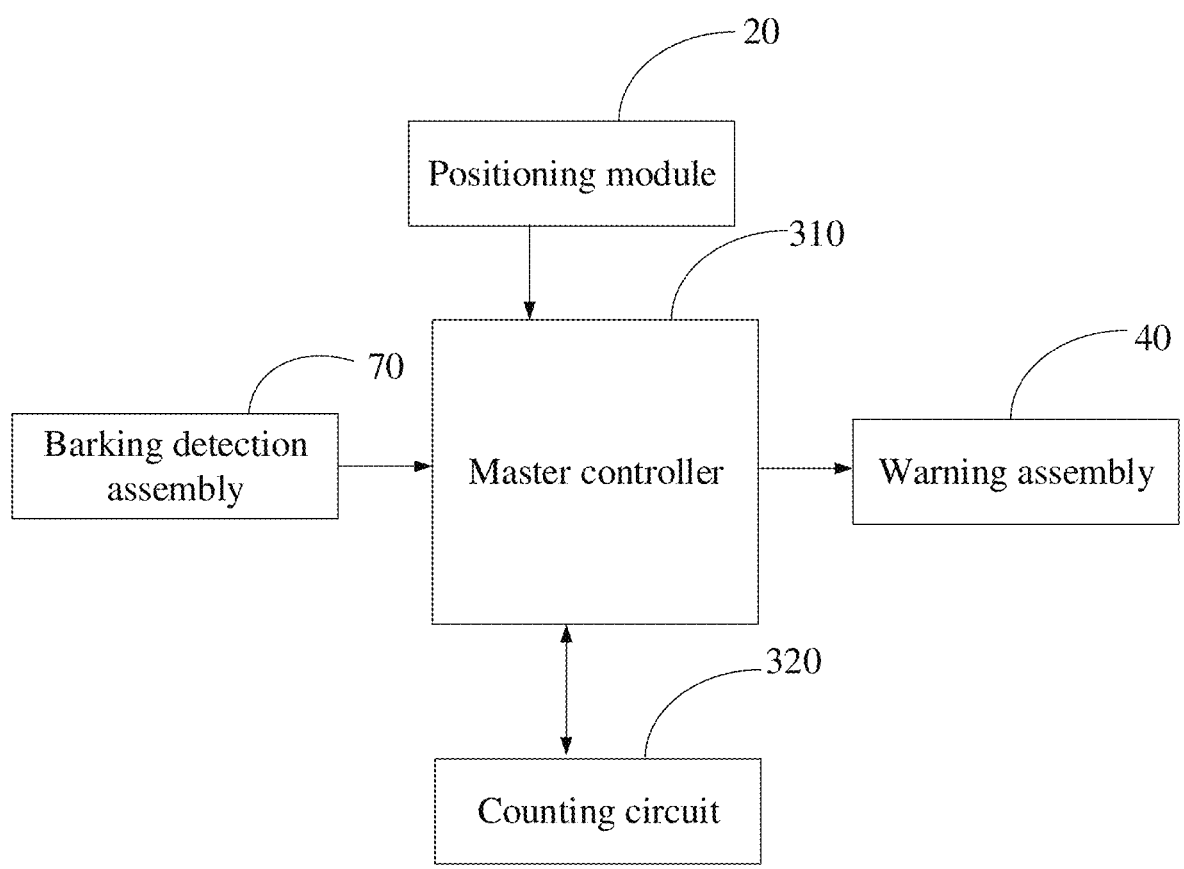
FIG. 9 is a structural schematic view diagram of the electronic fence according to still another embodiment of the present disclosure.
Figure 10:
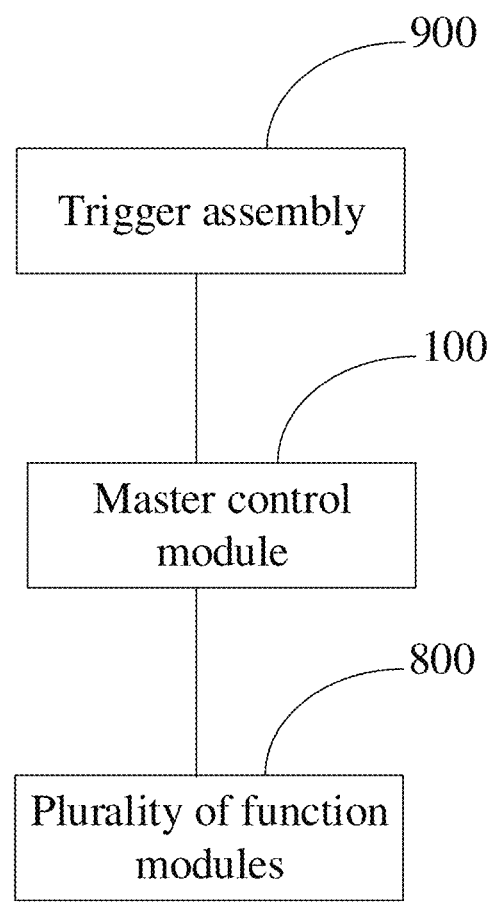
FIG. 10 is a circuit diagram of the electronic fence according to an embodiment of the present disclosure.

As shown in FIG. 9, in an embodiment, the master control circuit 30 includes: a master controller 310 and a counting circuit 320. The counting circuit 320 is electrically connected to the master controller 310 and is configured to output a corresponding counting result signal according to a counting value counted by the counting circuit 320. The master controller 310 is configured to control the counting value of the counting circuit 320 to be increased by one after receiving one barking detection signal, and to control the warning assembly 40 to operate or stop operating according to the counting result signal and the position detection signal.

In the present embodiment, the master controller 310 may be an MCU, a DSP, an FPGA, a PLC, a SOC, and so on. The counting circuit 320 may be a synchronous counter or an asynchronous counter. The master controller 310 controls the counting circuit 320 to add one to the counting value when receiving one barking detection signal; and controls the warning assembly 40 to operate or stop operating based on a comparison result of comparing the counting value with a preset counting value and the position detection signal. The master control circuit 30 controls the warning assembly 40 to operate when the position detection signal indicates that the position is outside the preset position range and the counting value of the barking detection signal is less than the preset value. The master control circuit 30 controls the warning assembly 40 to stop operating when the position detection signal indicates that the position is outside the preset position range and the counting value of the barking detection signal is greater than or equal to the preset value. In addition, in order to ensure that the electronic fence can be used normally after the special situation is over, the master controller 310 may control the counting circuit 320 to set the counting value to zero when detecting that the counting value remains unchanged in a preset time length. The preset time length may be set by the owner of the pet or the manufacturer of the electronic fence. In another embodiment, the master controller 310 and the counting circuit 320 may be integrated in one component, such as in one PLC, one SOC, or one FPGA, and so on.

In another embodiment, the user (such as the owner of the pet) may test functions of the electronic fence before or during using the electronic fence. For example, it may be tested whether the pet can be effectively warned when the pet is out of the preset position range. To facilitate testing, as shown in FIGS. 10-19, the electronic fence in the present disclosure includes: a master control module 100, a plurality of function modules 800, and a trigger assembly 900. The plurality of function modules 800 and the trigger assembly 900 are connected to the master control module 100. The trigger assembly 900 is configured to output a trigger signal when being triggered by the user. The master control module 100 controls, when receiving a first trigger signal, each of the plurality of function modules to be in an operating state.

In an embodiment, the plurality of function modules 800 include, but are not limited to, a positioning module 810, a buzzer alarm module 820, a vibration module 830, and an electric shock module 840. The trigger assembly 900 may be configured as a physical button or a virtual button.

Specifically, when the user or a tester conducts a functional test on the electronic fence, the user may trigger the trigger assembly 900, such that the trigger assembly 900 outputs a trigger signal to the master control module 100. The master control module 100 controls each of the plurality of function modules 800 to be in the operating state according to the trigger signal. It is to be noted that the trigger assembly 900 includes a test trigger assembly 910 and a plurality of test trigger members. The plurality of test trigger members are configured in one-to-one correspondence with the plurality of function modules 800. In this way, the user or the tester triggers the test trigger assembly 910 to control each of the plurality of function modules 800 to enter a test state when the master control module 100 receives a test trigger signal. Subsequently, the user or the tester can trigger one of the plurality of test trigger members corresponding to a respective one of the plurality of function modules that the user or the tester desires to perform a test, such that a function of the respective one of the plurality of function modules can be tested. For example, the user or the tester may trigger a positioning test trigger member corresponding to the positioning module 810, and the master control module 100 positions the positioning module 810 according to a positioning test trigger signal output from the positioning test trigger member, such that a center point of the electronic fence is determined, so as to test a positioning function of the positioning module 810. Similarly, the user or the tester may trigger a test trigger member corresponding to the buzzer alarm module 820, and the master control module 100 may control the buzzer alarm module 820 to emit a sound according to a received corresponding trigger signal in order to test a function of the buzzer alarm module. That is, a situation where the pet wearing the electronic fence of the present application is located out of the preset position range is mimicked, and the master control module 100 may control the buzzer alarm module 820 to emit the sound to warn the pet to return to the preset position range. To be noted that when the user or the tester conducts the function test on the plurality of function modules 800, the preset position range may not be determined, and the user does not need to walk outside the preset position range to trigger the test. The user can stay at any location and trigger the trigger assembly 900 to perform the test to determine whether the electronic fence operates properly. In this way, it is more convenient for the tester or the user to test the functions of the electronic fence.

The present disclosure provides a wireless electronic fence including the master control module 100, the plurality of function modules 800 and the trigger assembly 900. The plurality of function modules and the trigger assembly 900 are electrically connected to the master control module 100. The trigger assembly 900 is configured to output the trigger signal when being triggered by the user. The master control module 100 is configured to control, when receiving the trigger signal, each of the plurality of function modules to be in the operating state.

In practice, when testing the wireless electronic fence of the present disclosure, the user or the tester only needs to trigger the trigger assembly 900, such that the trigger assembly 900 outputs the trigger signal to the master control module 100. The master control module 100 outputs, after receiving the trigger signal, the corresponding control signal to each of the plurality of function modules 800 to control each of the plurality of function modules 800 to enter the operating state. In this way, during testing functions of the wireless electronic fence, the test can be performed by the tester or the user triggering the trigger assembly 900. In the related art, the preset position range is set firstly, and then the user walks outside the preset position range, and subsequently, the test can be started. By contrast, in the present disclosure, the user or the tester can perform the test at any location. In this way, the wireless electronic fence can be used and tested more conveniently.

Figure 11:
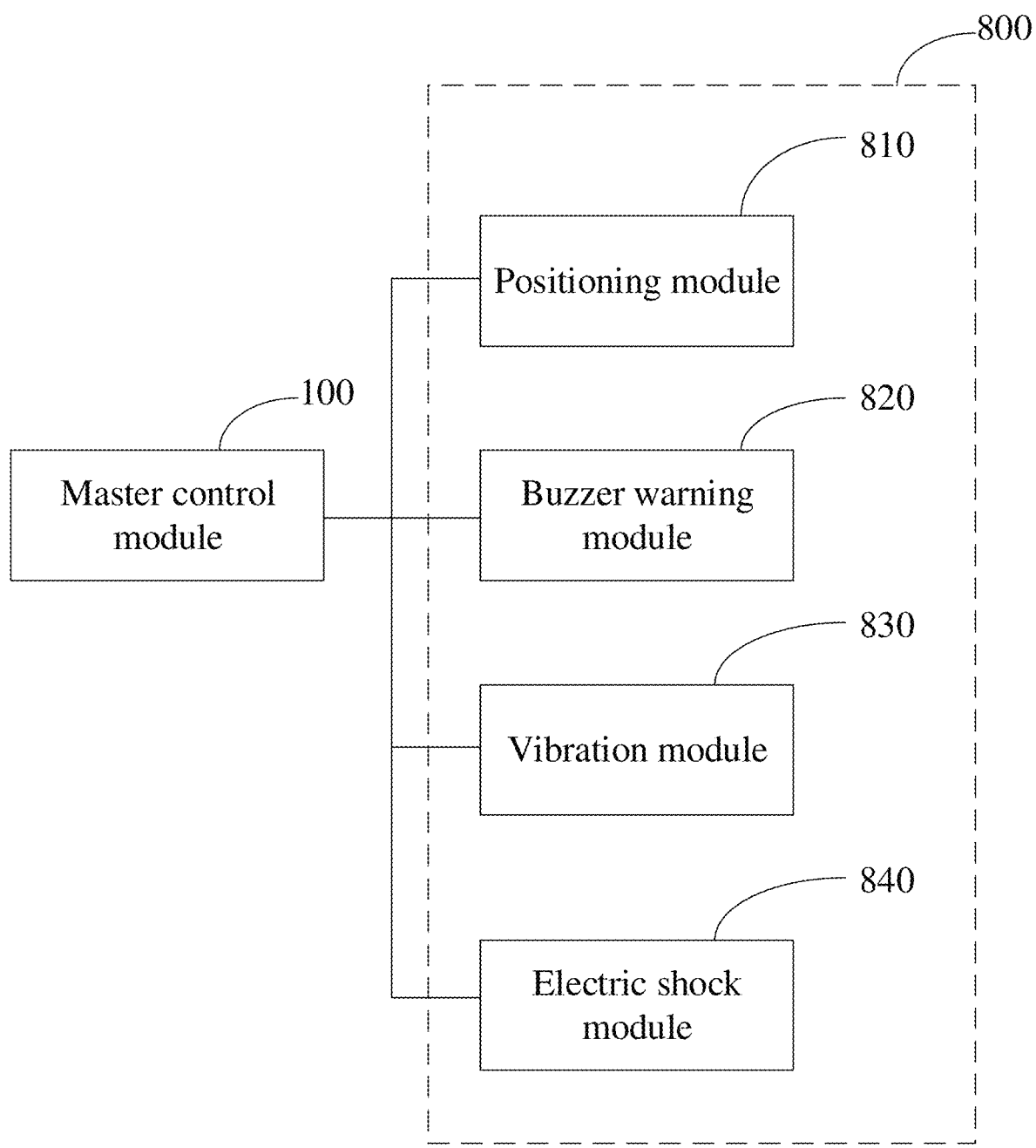
FIG. 11 is a circuit diagram of the electronic fence according to another embodiment of the present disclosure.
Figure 12:
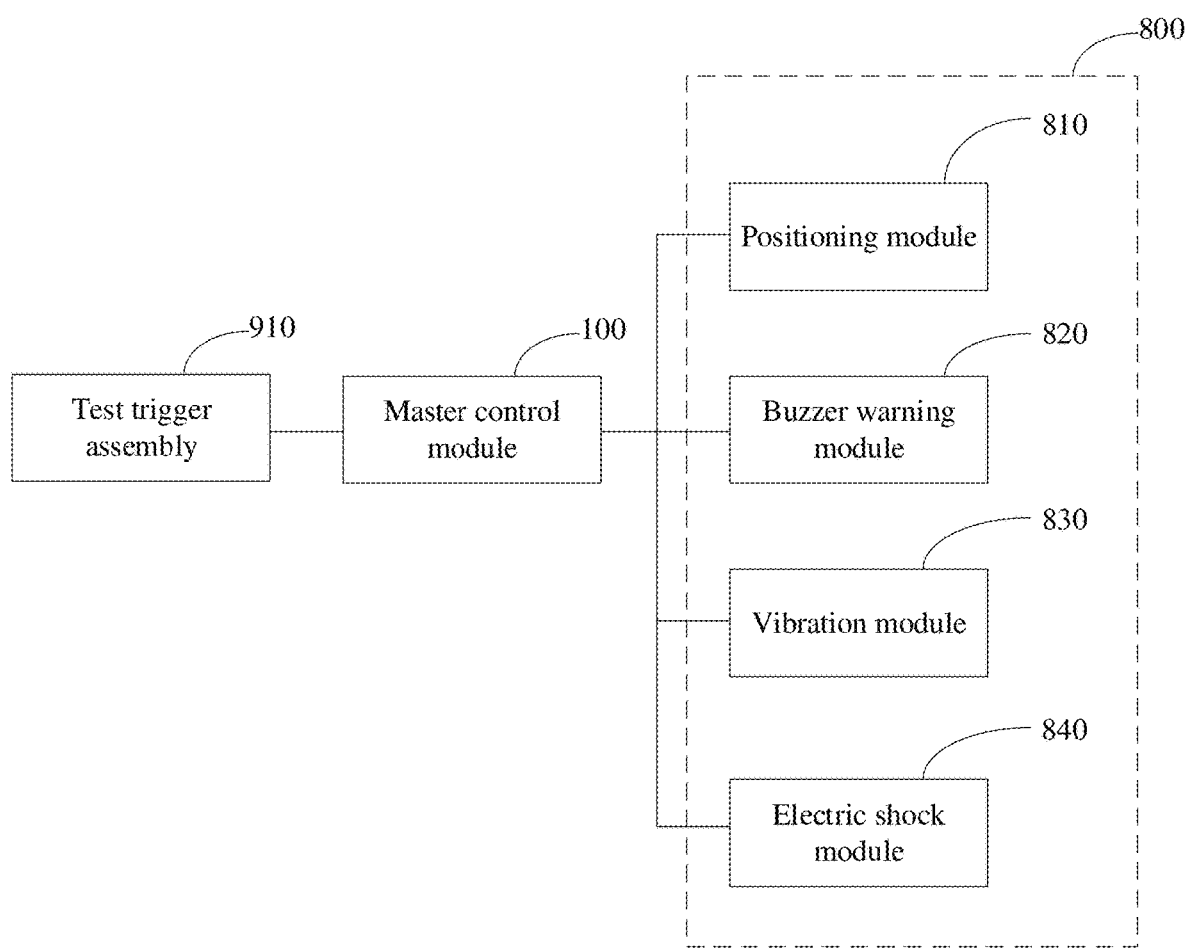
FIG. 12 is a circuit diagram of the electronic fence according to still another embodiment of the present disclosure.
Figure 13:
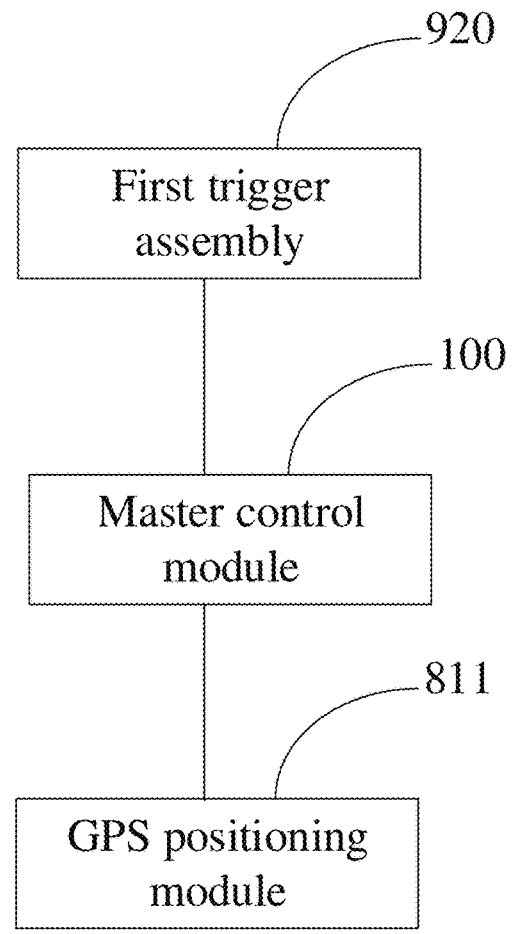
FIG. 13 is a circuit diagram of the electronic fence according to still another embodiment of the present disclosure.

In another embodiment, as shown in FIGS. 11-13, the plurality of function modules include the following.

The positioning module 810 is electrically connected to the master control module 100 and is configured to receive satellite positioning signals, process the signals, and output the processed signals to the master control module 100.

The trigger assembly 900 includes the following.

The test trigger assembly 910 is electrically connected to the master control module 100 and is configured to output the test trigger signal when being triggered by the user.

A first trigger member 920 is electrically connected to the master control module 100 and is configured to output the first trigger signal when being triggered by the user.

The master control module 100 is configured to: control, when receiving the test trigger signal, the plurality of function modules to be in the test state; and control, when receiving the first trigger signal in the test state, the positioning module 810 to enter the operating state.

The test trigger signal and the first trigger signal are trigger signals.

In the present embodiment, the positioning module 810 may be configured as a GPS positioning module 211, a BeiDou module, an inertial guidance module, and the like. Each of the test trigger assembly 910 and the first trigger member 920 may be configured as a physical button or a virtual button.

Specifically, the positioning module 810 is the GPS positioning module 211, each of the test trigger assembly 910 and the first trigger member 920 is the physical button. The first trigger member 920 may be a physical positioning button. When the user or the tester desires to test the plurality of function modules 800, the test trigger assembly 910 needs to be triggered in order to output the test trigger signal to the master control module 100, the master control module 100 controls the plurality of function modules 800 to enter the test state according to the test trigger signal. In the test state, when the user or the tester triggers the positioning button, a corresponding first trigger signal is output to the master control module 100, and the master control module 100 controls the GPS positioning module 211 to operate according to the first trigger signal. That is, the satellite positioning signal is received and output, after being processed, to the master control module. In this way, the user can test a positioning function of the wireless electronic fence and obtain a corresponding result through the master control module 100. In practice, the GPS positioning module 211 operates under the control of the master control module 100 to locate the pet, enable the owner of the pet to obtain the position and a movement track of the pet. The user can determine whether the pet is out of the preset position range according to the result output from the positioning module 810. In addition, the user or the tester may set a current location of the pet as a center point, set a range of the wireless electronic fence taking the center point as a center of the electronic fence. In this way, the pet is allowed to move within the range of the electronic fence, and a movement scope of the pet is limited. The pet is prevented from running out of the range and getting lost or randomly walking outside the range of the electronic fence, an unnecessary trouble is prevented. Therefore, practicability of the wireless electronic fence is improved. Moreover, the test trigger assembly 910 and the first trigger member 920 are configured as physical buttons, and therefore, the buttons are presented in a more intuitive manner. The physical button is usually composed of elastic elements and mechanical structures, a feedback of the button is clear, and therefore, the electronic fence can be used more conveniently. Furthermore, the GPS positioning module 211 is arranged to accurately locate the pet. Due to the large number of GPS satellites and the GPS satellites being distributed uniformly, global all-day continuous navigation and positioning can be achieved at any place and at any moment on the earth. Compared with other types of positioning modules 810, such as the Wi-Fi positioning module 810 and an infrared positioning module 810, the GPS positioning module 211 allows the electronic fence to be used more conveniently. In this way, accuracy of positioning of the wireless electronic fence is improved.

In an embodiment, as shown in FIG. 11, the plurality of function modules include at least one of the following modules.

The buzzer alarm module 820 is electrically connected to the master control module 100 and configured to operate under the control of the master control module 100.

The vibration module 830 is electrically connected to the master control module 100 and configured to operate under the control of the master control module 100.

The electric shock module 840 is electrically connected to the master control module 100 and configured to operate under the control of the master control module 100.

In the present embodiment, the buzzer alarm module 820 may be configured as a piezoelectric buzzer or a magnetic buzzer or the like. The vibration module 830 may be configured as a rotor motor, a linear motor and the like. The electric shock module 840 may be configured as a high voltage generator including a pulse generator, a driver and a high voltage transformer.

Figure 14:
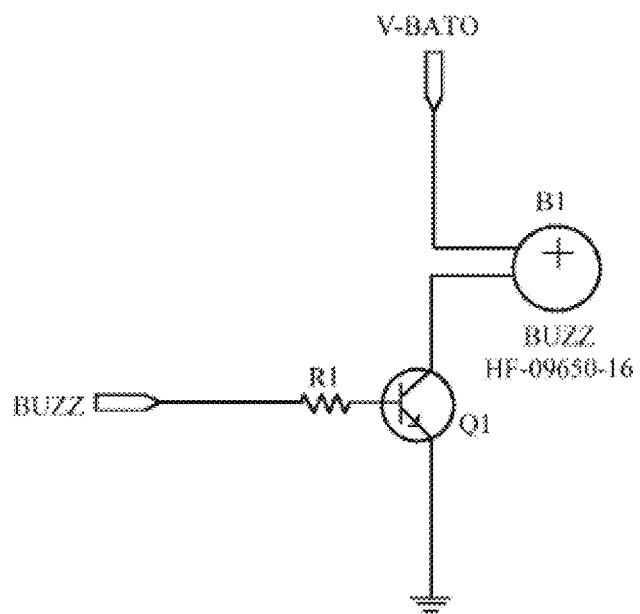
FIG. 14 is a circuit diagram of a buzzer alarm module according to an embodiment of the present disclosure.
Figure 15:
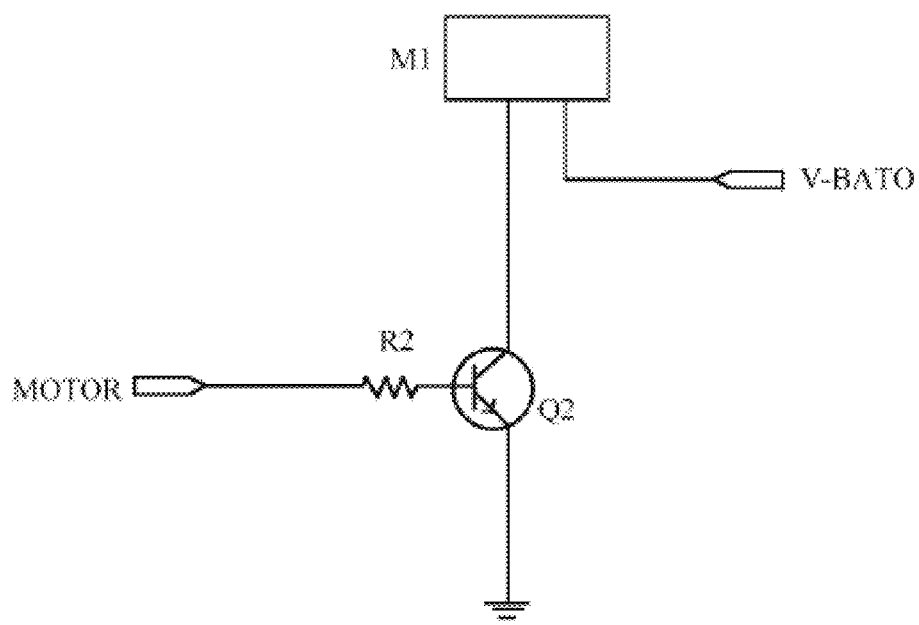
FIG. 15 is a circuit diagram of a vibration module according to an embodiment of the present disclosure.
Figure 16:
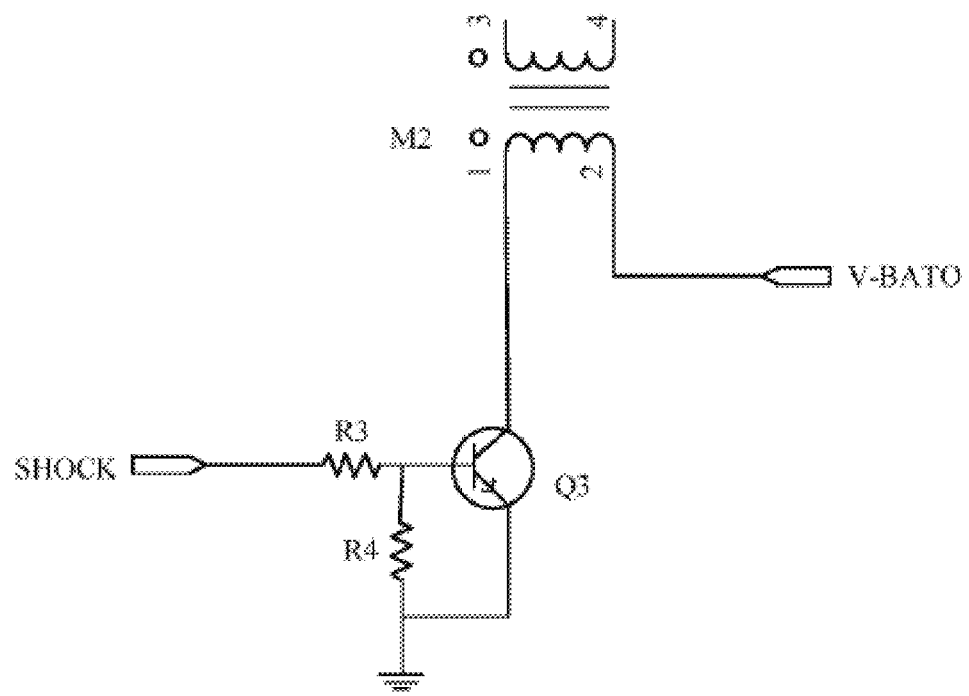
FIG. 16 is a circuit diagram of an electric shock module according to an embodiment of the present disclosure.

As shown in FIGS. 14-16, specific circuit diagrams of the buzzer alarm module 820, the vibration module 830, and the electric shock module 840 are shown.

Specifically, as shown in the above embodiments, as shown in FIG. 12, the test trigger assembly 910 may be an M button. When the user presses the M key, the master control module 100 controls the buzzer alarm module 820, the vibration module 830, and the electric shock module 840 to enter the test state and enter a test mode. In some embodiments, when the user or the tester tests a sound warning mode of the wireless electronic fence, a test trigger key corresponding to the sound warning mode is arranged, and when the user presses the corresponding test trigger key, a corresponding sound test trigger signal is output to the master control module 100. The master control module 100 in the test state outputs a corresponding control signal to a BUZZ signal end to enable a switch circuit Q1 in the buzzer alarm module 820 to be conducted, a power supply end V-BATO of the buzzer alarm module 820 is supplied with power, such that a buzzer BI emits the sound. In this way, the sound warning mode can be tested. Similarly, when the user or the tester tests a vibration mode of the wireless electronic fence, a test trigger button corresponding to the vibration mode is pressed, and the master control module 100 is in the test state and outputs, according to a vibration test trigger signal outputted by the test trigger button, a corresponding control signal to a MOTOR signal end to control a switch circuit Q2 to be conducted. A power supply end V-BATO of the vibration module 830 is supplied with power, and therefore, a vibration motor M1 vibrates. Similarly, when the user or tester presses a test trigger button corresponding to the electric shock module 840, a corresponding electric shock test trigger signal is output to the master control module 100, and in the test state, the master control module 100 outputs a corresponding control signal to a SHOCK signal end to control a switch circuit Q3 to be conducted, such that a transformer M2 starts operating. A power supply end V-BATO of the electric shock module 840 is supplied with power, an output pin 3 and an output pin 4 of the transformer output, after boosting, a preset voltage to achieve the electric shock. It is to be understood that the preset voltage may be set by a developer in advance so that when the preset voltage is output for the electric shock, the pet is not harmed but is warned only.

It is to be noted that test trigger buttons corresponding to the sound warning module, the vibration module 830, and the electric shock module may be peripherally mounted on the wireless electronic fence, so as to facilitate the user or the tester to be able to test the sound warning module, the vibration module 830, and the electric shock module respectively.

In some embodiments, in combination with the above embodiments, when the trigger assembly 900M is pressed, the test mode is entered, and in the test mode, when the user presses the M button, the master control module 100 controls the plurality of function modules 800 to enter the operating state sequentially within a preset time length in order to test the functions of the electronic fence.

For example, the user may firstly press the button 910M of the test trigger assembly to enable the plurality of function modules to enter the test state, i.e., entering the test mode. Subsequently, when the user presses the M key again, the master control module 100 may firstly control the buzzer alarm module 820 to continuously emit the sound for a first preset time length. When the first preset time length is reached, the master control module 100 controls the vibration module 830 to vibrate in a second preset time length. When the second preset time length is reached, the master control module 100 controls the electric shock module 840 to perform the electric shock in a third preset time length. When the third preset time length is reached, the master control module 100 may control the vibration module 830 to perform a vibration wake-up detection, and that is, after the number of vibration times reaches a preset number, the master control module 100 controls the vibration module 830 to be in a non-operating state in a preset time length, and when the preset time length is reached, the master control module 100 further control the vibration module 830 to be in the operating state. In this way, the user or the tester can determine whether a vibration wake-up function of the electronic fence is normal during testing. It is to be noted that the first preset time length, the second preset time length, and the third preset time length may be set as the same preset time length or to different preset time lengths. In addition, a priority order of testing the plurality of function modules 800 may be set in advance by a developer during a research and development stage. For example, when the user presses the M button, the master control module 100 may firstly control the electric shock module 840 to perform the electric shock and then control the buzzer alarm module 820 to alarm by emitting the sound. Moreover, a sound decibel level of the buzzer alarm module 820, a vibration level of the vibration module 830, and an electric-shock strength level of the electric shock module 840 may be set by the developer. A highest vibration level and a highest electric-shock strength level are controlled by a low voltage or a small current. That is, the vibration and the electric shock do not harm the pet, and only provide the warning. In this way, when the M button is pressed to enter the test mode, the master control module 100 can perform the test for each level. For example, the master control module 100 controls the vibration module 830 to vibrate at a lowest vibration level for 3 seconds firstly, and subsequently, controls the vibration module 830 to vibrate at the highest vibration level for 3 seconds. That is, the user or the tester can test the lowest and the highest sound levels, the lowest and the highest vibration levels, and the lowest and the highest electric-shock strength levels, respectively, such that a strength of each level can be acknowledged, and the extent of warning to the pet can be obtained.

It is to be understood that the electronic fence may further include: a timing module and a times detection module. The timing module and the times detection module are electrically connected to the master control module 100. In the present embodiment, the timing module can be configured based on a clock chip or a clock circuit. The times detection module can be configured based on a pulse counter or a controller, in order to count the number of times that a function module currently in the operating state is triggered. For example, when testing the vibration wake-up function, when the user or the tester triggers the trigger assembly 900 corresponding to the vibration wake-up function, the master control module 100 controls, based on a corresponding trigger signal output by the trigger assembly 900, the times detection module to count the number of vibrations of the electronic fence. When the preset number of vibrations is reached, the times detection module outputs a result of the number of vibrations to the master control module 100. The master control module 100 controls the vibration module 830 to be in the non-operational state within the preset time length based on the result of the number of vibrations. For example, when the master control module 100 controls the buzzer to emit the sound, i.e., beep a few times, after the number of vibrations reaches 7, indicating that the vibration wake-up function is effective. In this way, the user or the tester can test the vibration wake-up function of the electronic fence. In addition, when the master control module 100 receives the first trigger signal, the master control module 100 controls the timing module to perform timing and outputs a first timing result to the master control module 100. The master control module 100 controls at least one of the plurality of function modules 800 to be in the operating state according to the first timing result to test the function of the operating one of the plurality of function modules 800. In addition, the master control module 100 controls the timing module to clear the timing result to zero after the preset time length is reached, the timing module restarts the timing and outputs a second counting result to the master control module 100. The master control module 100 controls another one of the plurality of function modules to be in the operating state according to the second timing result to test the function of the another one of the plurality of function modules.

According to the above, the user or the tester can test the functions of the plurality of function modules 800 of the electronic fence and determine whether the electronic fence is qualified based on test results. In this way, convenience in testing the functions of the wireless electronic fence of the present disclosure is improved.

Figure 17:
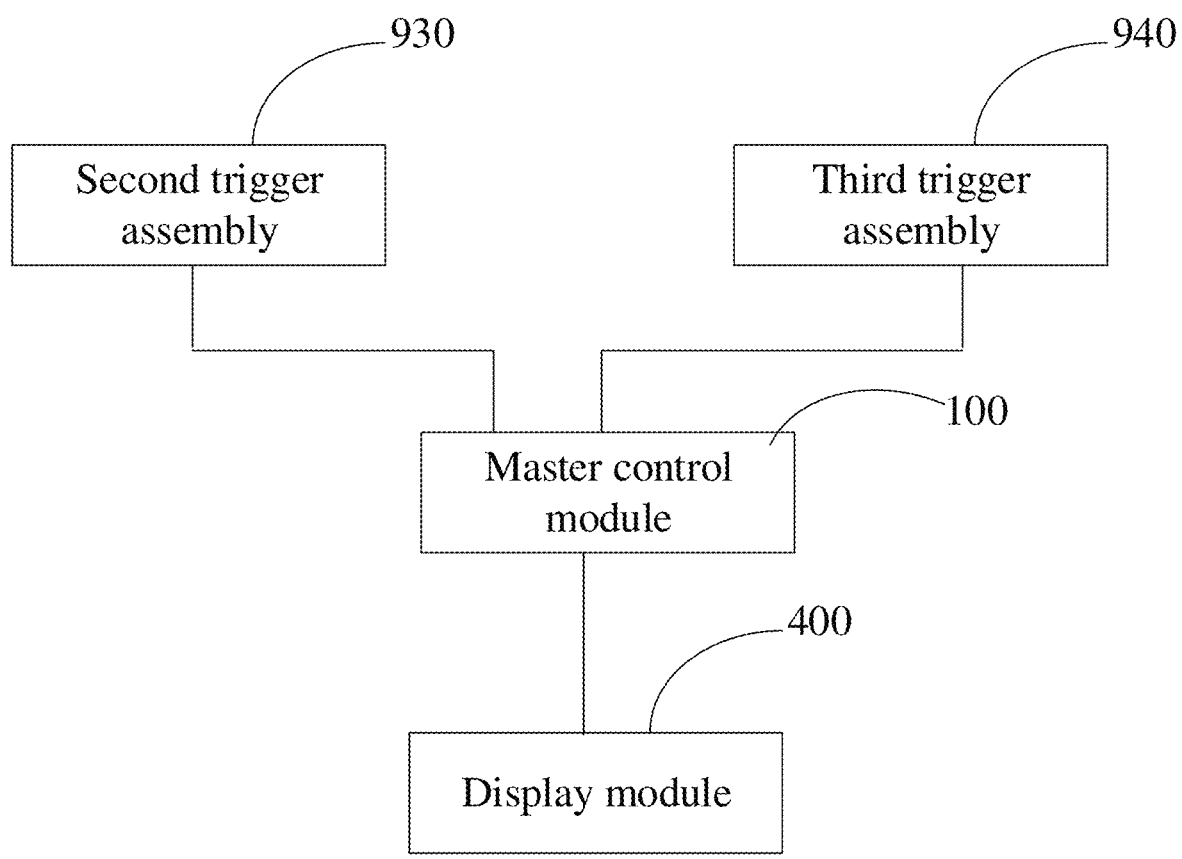
FIG. 17 is a circuit diagram of the electronic fence according to another embodiment of the present disclosure.
Figure 18:
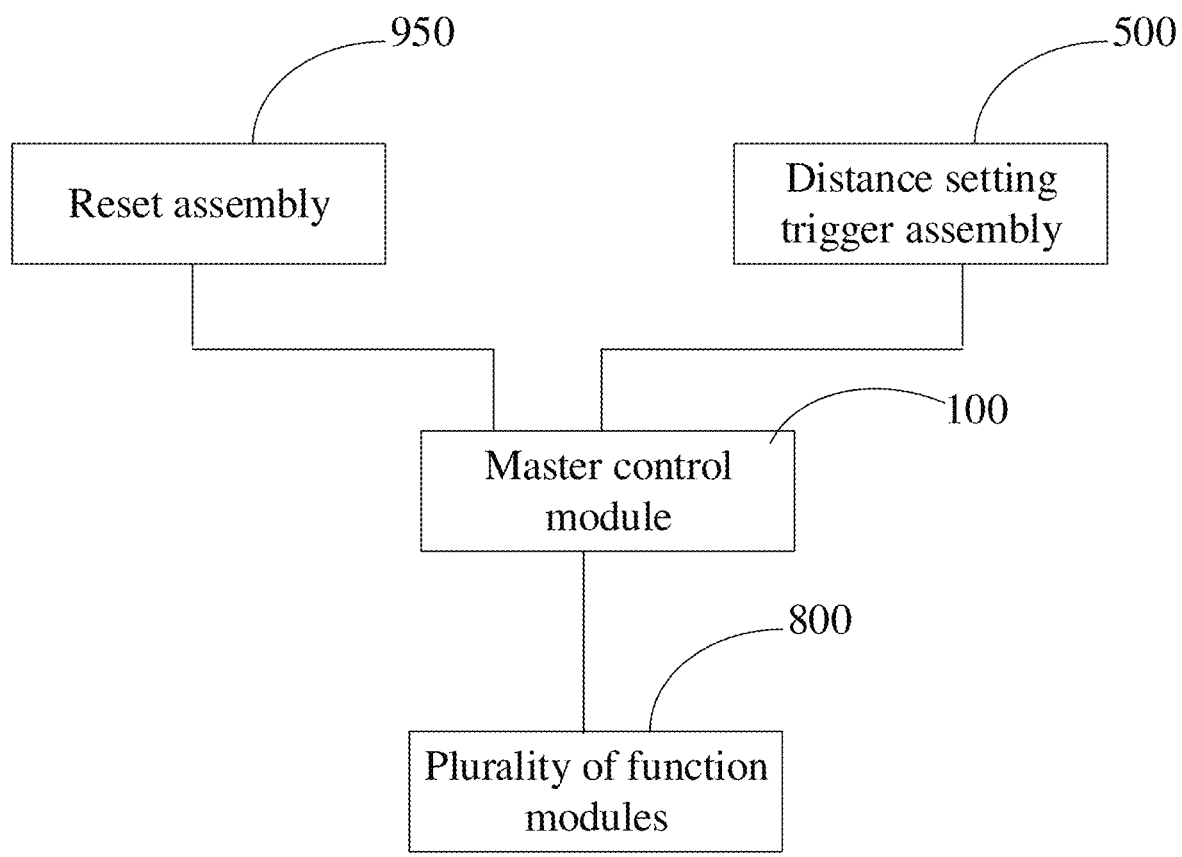
FIG. 18 is a circuit diagram of the electronic fence according to another embodiment of the present disclosure.
Figure 19:
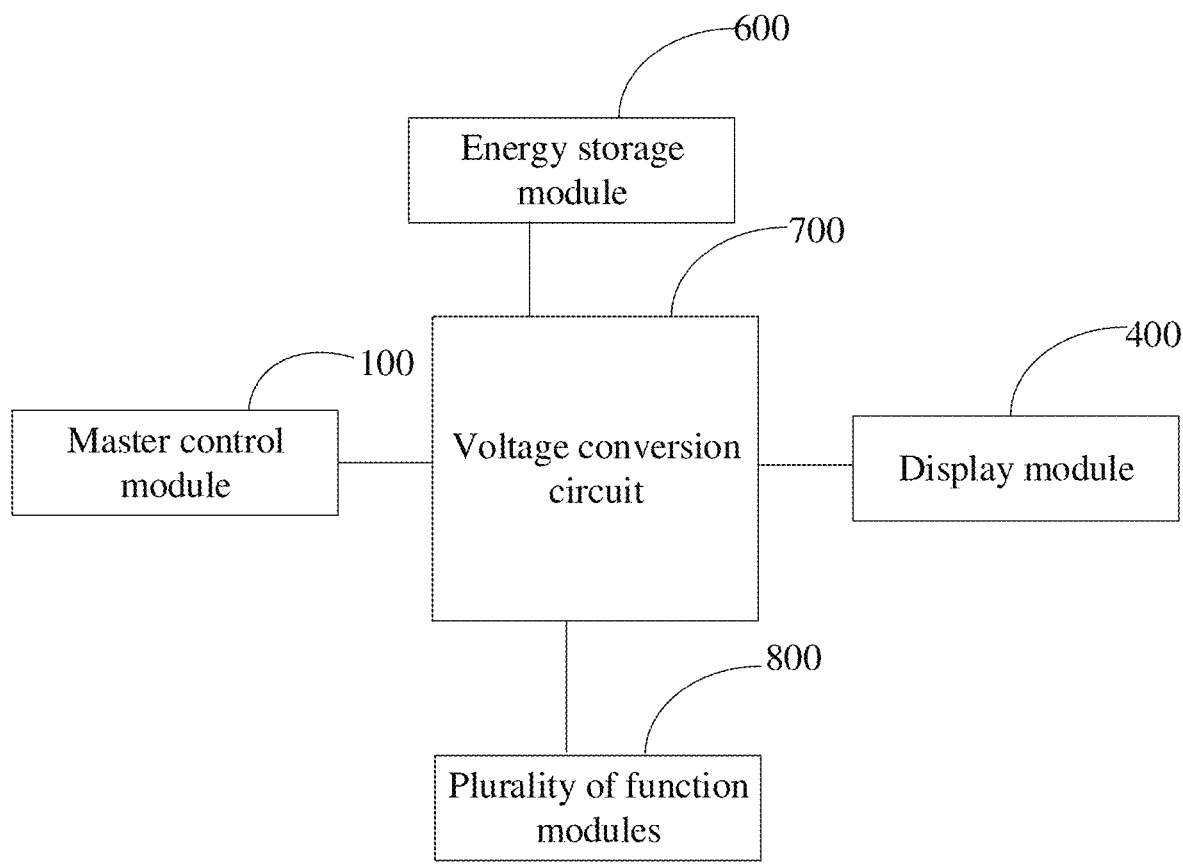
FIG. 19 is a circuit diagram of the electronic fence according to another embodiment of the present disclosure.

In another embodiment, as shown in FIGS. 17-18, the wireless electronic fence includes following components.

A display module 400 is electrically connected to the master control module 100.

The trigger assembly 900 includes the following.

A second trigger member 930 is electrically connected to the master control module 100 and configured to output the second trigger signal when being triggered by the user.

A third trigger member 940 is electrically connected to the master control module 100 and configured to output a third trigger signal when being triggered by the user.

The master control module 100 is configured to: control the display module 400 to display the number of satellites when the GPS positioning module 211 is in the operating state; and control, in response to receiving the third trigger signal and being in the test state, the display module 400 to display an average signal-to-noise ratio when the GPS positioning module 211 is in the operating state.

A reset assembly 950 is electrically connected to the master control module 100 and configured to output a reset signal when being triggered by the user.

The master control module 100 is configured to perform a reset action when receiving a reset signal.

The wireless electronic fence includes the following components.

A distance setting trigger assembly 500 is electrically connected to the master control module 100 and is configured to output, when being triggered by the user, a distance setting trigger signal.

The master control module 100 is configured to set the preset position range according to the distance setting trigger signal.

In the present embodiment, the display module 400 may be configured as a display screen and a corresponding driver module, such as an LCD screen and an LCD screen driver module, an LED screen and an LED screen driver module, and an OLED screen and an OLED screen driver module. Each of the second trigger member 930, the third trigger member 940, the reset assembly 950, and the distance setting trigger assembly 500 can be configured as a physical button or a virtual button.

It should be noted that the GPS mainly involves three aspects: satellites, receivers, and signals. The GPS system includes 24 satellites. The 24 satellites send GPS signals containing information such as satellites and time to the receiver, the receiver takes an internal control module to process the signals. For example, the receiver performs calculation to determine a position of the receiver. The positioning module 810 in the wireless electronic fence is the receiver that can receive the GPS signals and output processed signals to the master control module 100, such that the user or the tester to can obtain relevant information about current GPS signals through the external terminal that establishes communication connection with the master control module 100, or through the display module 400 that is electrically connected to the master control module 100.

Specifically, the second trigger member 930 may be a plus button, and the third trigger member 940 may be a minus button. In combination with the above embodiments, when the user presses the test trigger assembly 910 and triggers the second trigger member 930, i.e., when the plus button is pressed, the corresponding second trigger signal is output to the master control module 100. The master control module 100 controls the GPS positioning module 811 to receive the satellite signals and to output the satellite signals to the master control module 100. In the test state, the master control module 100 takes, based on the received satellite signals, an internal processing module to process the signals to output a result of the number of satellites to the display module 400; and controls the display module 400 to display the result of the number of satellites of the GPS positioning module 811 that is currently in the operating state. In this way, the user or the tester obtains the number of satellites involved in the positioning. The number of satellites may represent presence or absence of GPS signals. Similarly, when the user or the tester presses the minus button of the wireless electronic fence, the corresponding third trigger signal is output to the master control module 100, such that the master control module 100 in the test state controls the positioning module 810 to output the received satellite signals to the master control module 100. The master control module 100 takes the internal processing module to process the satellite signals and outputs an average signal-to-noise ratio to the display module 400. The master control module 100 controls the display module 400 to display the average signal-to-noise ratio when the GPS positioning module 811 is in the operating state. In this way, the user or the tester may obtain the average signal-to-noise ratio that is involved in the positioning through the display module 400. The average signal-to-noise ratio may represent signal strength of the current GPS signals. Arranging the second trigger member 930 and the third trigger member 940 enables the user or the tester to test the GPS signals involved in the positioning of the wireless electronic fence in order to obtain the signal strength to determine whether the positioning is accurate.

It is to be noted that, in order to more accurately represent the current GPS signals, the master control module 100 may receive the result of the number of satellites and the average signal-to-noise ratio; and output a corresponding GPS signal result to the display module 400 according to the received result of the number of satellites and the average signal-to-noise ratio. In this way, the user or the tester can obtain the GPS signal result through the display module 400, and then obtains the signal strength of the current GPS signals. For example, it may be set that when the average signal-to-noise ratio is less than 10 dB or the number of satellites involved in the positioning is less than 3, the master control module 100 controls the display module 400 to display the signal strength of the current GPS signals as 0. When the average signal-to-noise ratio is not less than 13 dB and the number of satellites involved in the positioning is not less than 6, the master control module 100 controls the display module 400 to display the signal strength of the GPS signals as 1. In this way, the signal strength of the current GPS signals involved in the positioning is determined based on the result of the number of satellites and the average signal-to-noise ratio, accuracy of a GPS signal determination result is improved.

In the present embodiment, the distance setting trigger assembly 500 may be arranged to set the wireless electronic fence range. The distance setting trigger assembly 500 may be a plus button and a minus button. When the user or the tester presses the plus button, the master control module 100 in the wireless electronic fence expands the electronic fence outwardly from a center point of the positioning, a radius of the electronic fence is increased by 1. Similarly, when the user or the tester presses the minus button, the master control module 100 controls a currently set radius to be decreased by 1. That is, in practice, the user or the tester can set the radius of the electronic fence by pressing the plus button and minus button, such that the pet can safely move within the electronic fence range. When the GPS positioning module 211 locates that the current position of the pet is out of the wireless electronic fence range set by the user, the GPS positioning module 211 outputs a corresponding signal to the master control module 100, and the master control module 100 controls the warning module to warn the pet based on a warning mode preset by the user so as to force the pet to move into the wireless electronic fence range. The warning mode include the sound warning mode, the vibration mode, and the electric shock mode as described in the above embodiment.

It is understood that the distance setting trigger assembly 500, the second trigger member 930, and the third trigger member 940 can all be integrated within one integrated chip to reduce a wiring area. Alternatively, the distance setting trigger assembly 500, the second trigger member 930, and the third trigger member 940 are configured separated from each other.

In addition, when the user or the tester triggers the reset assembly 950, the corresponding reset signal is output to the master control module 100, and the master control module 100 performs the reset action based on the reset signal to control the operating state of each of the plurality of function modules 800. For example, a default setting mode corresponding to the reset signal triggered by the reset assembly 950 can be set by the research and development personnel in advance. When the user or the tester triggers the reset assembly 950, the wireless electronic fence is directly reset a default setting. For example, the GPS positioning module 211 is controlled to enter the non-operating state, the center point does not need to be positioned, such that the user may perform the positioning again easily. Further, the default setting may include: the radius of the electronic fence range being set to be 50 yards; and a current punishment mode being the electric shock mode. In this way, in practice, the user no longer needs to set each function module in turn, the user only needs to press one button to reset the electronic fence to the default setting. Arranging the reset assembly 950 improves the usage convenience.

It is to be noted that, in combination with the above embodiments, the reset assembly 950 and any trigger assembly 900 of the above embodiments may be integrated in one integrated chip to reduce the wiring area. In order to reduce the wiring area, it may be set that when the user or the tester long-presses any trigger assembly 900 in the above embodiments for a preset long-press time length, the master control module 100 controls the electronic device to be reset to the default setting. The user or the tester is prevented from mistakenly triggering a certain trigger assembly 900, i.e., the user is prevented from pressing the trigger assembly 900 to reach the preset long-press time length by mistake where the electronic device is not desired to be reset to the default setting, and in this case, the wireless electronic fence range and a punishment level need to be set again, and therefore, an unnecessary operation needs to be performed, which is inconvenient for usage. In addition, the reset assembly 950 may be configured as a combination of buttons. For example, it may be set that the default setting will be restored only when the positioning button and the minus button of the above embodiment are pressed at the same time, or only when the positioning button and the minus button are long-pressed for a preset long-press time length. The preset long-press time length may be set in advance by the research and development personnel during research. Similarly, the trigger assembly 900 in the above embodiment may be configured as a combination of various buttons. In this way, a false trigger may be prevented, setting the wireless electronic fence may be more accurate.

In an embodiment, as shown in 19, the wireless electronic fence includes the following.

An energy storage module 600 is provided.

A voltage conversion circuit 700 is provided and is electrically connected to the energy storage module 600 and the master control module 100.

The master control module 100 is configured to control the voltage conversion circuit 700 to output, after performing voltage conversion, an output voltage of the energy storage module 600.

In the present embodiment, the energy storage module 600 may a battery such as a lithium battery, a lead-acid battery, or a supercapacitor, and so on. The voltage conversion circuit 700 may be at least one of: a switch transistor, an inverter, a rectifier, a filtering circuit, and a booster and buck circuit; or may be a voltage conversion chip.

Specifically, the voltage conversion circuit 700 may convert the output voltage of the energy storage module 600 and output the converted voltage to supply power to each power-consuming module, such as the master control module 100, the display module 400, the plurality of function modules 800, and the like. For example, the output voltage of the energy storage module 600 is converted to a stable DC supply voltage of 3.3 V to the master control module 100. It is understood that a plurality of voltage conversion circuits 700 may be arranged, and each of the plurality of voltage conversion circuits 700 may be electrically connected to a respective one of the master control module 100, the display module 400, and each of the plurality of function modules 800. Each of the plurality of voltage conversion circuits 700 is configured to output the output voltage of the energy storage module 600 to each respective power-consuming module electrically connected to the energy storage module 600 to supply power to each respective power-consuming module.

Obviously, any ordinary skilled person in the art may perform various modifications and variations to the embodiments of the present disclosure without departing from the spirit and scope of the present disclosure. Therefore, when the modifications and the variations of the embodiments of the present disclosure fall within the scope of the claims of the present disclosure and technical equivalents thereof, the present disclosure is intended to include the modifications and variations.

In the present application, the term "comprise" and variations thereof may refer to non-limiting inclusion. The term "or" and variations thereof may refer to "and/or". The terms "first" and "second" are used to distinguish similar objects and need not be used to describe a particular order or sequence. In the present disclosure, "a plurality of" means two or more. The "and/or" describes an association relationship of associated objects, indicates that three kinds of relationships can exist. For example, A and/or B indicates three cases, the A is present alone, both A and B are present, and the B is present alone. The character "/" indicates an object before the character "or" an object after the character.

What is claimed is:

1. A wireless electronic fence, configured to be worn on a pet, the wireless electronic fence comprising:
    a positioning assembly, configured to: receive a first signal sent by an external terminal, determine a position of the positioning assembly based on the first signal; and output a position detection signal carrying the position;
    a signal detection assembly, electrically connected to the positioning assembly and configured to detect a signal strength of the first signal and output a signal strength detection signal, wherein the signal strength detection signal carries the signal strength of the first signal;
    a warning assembly; and
    a master control circuit, electrically connected to the positioning assembly, the signal detection assembly and the warning assembly and configured to: receive the signal strength detection signal; compare the signal strength of the first signal carried in the signal strength detection signal with a preset signal strength to produce a comparison result; and control the warning assembly to operate or to stop operating according to the comparison result.

2. The wireless electronic fence according to claim 1, wherein, the master control circuit is configured to:
    control the warning assembly to stop operating in a case that the signal strength of the first signal is less than the preset signal strength; and
    in a case that the signal strength of the first signal is greater than or equal to the preset signal strength, control the warning assembly to operate or stop operating based on at least the position detection signal.

3. The wireless electronic fence according to claim 2, wherein the first signal is a navigation signal emitted by a navigation satellite or a plurality of wireless signals emitted by a plurality of transmitters.

4. The wireless electronic fence according to claim 3, wherein, when the first signal is the navigation signal transmitted by the navigation satellite:
    the signal detection assembly is configured to detect a signal strength of the navigation signal and output a signal strength detection signal carrying the signal strength of the navigation signal; and
    the master control circuit is configured to determine that the signal strength of the first signal is less than the preset signal strength in a case that the signal strength of the navigation signal is less than the preset signal strength, and to control the warning assembly to stop operating.

5. The wireless electronic fence according to claim 3, wherein, when the first signal is the plurality of wireless signals emitted by the plurality of transmitters:
    the signal detection assembly is configured to detect a signal strength of each of the plurality of wireless signals and output a signal strength detection signal carrying the signal strength of each of the wireless signals; and
    the master control circuit is configured to: determine, in a case that the signal strength of at least one wireless signal of the plurality of wireless signals is less than the preset signal strength, that the signal strength of the first signal is less than the preset signal strength; and control the warning assembly to stop operating.

6. The wireless electronic fence according to claim 3, wherein when the first signal is the plurality of wireless signals emitted from the plurality of transmitters, the positioning assembly is configured to determine the position of the positioning assembly based on a signal strength of each of the plurality of wireless signals and/or a signal angle at which each of the plurality of wireless signals is emitted, and a position of each of the plurality of transmitters.

7. The wireless electronic fence according to claim 3, wherein, the master control circuit is configured to:
    compare the position carried in the position detection signal with a preset position range; and
    control the warning assembly to stop operating in a case that the signal strength of the first signal is greater than or equal to the preset signal strength and the position is located within the preset position range.

8. The wireless electronic fence according to claim 2, wherein the signal detection assembly is configured to determine the signal strength of the first signal based on a voltage value of the first signal.

9. The wireless electronic fence according to claim 2, further comprising a situation determination module, electrically connected to the master control circuit and configured to determine a situation confronted by the pet and generate a situation signal to be sent to the master control circuit;
    wherein the master control circuit is configured to: control the warning assembly to operate or stop operating based on the situation signal and the position detection signal in a case that the signal strength of the first signal is greater than or equal to the preset signal strength.

10. The wireless electronic fence according to claim 9, wherein the situation determination module comprises a motion detection assembly configured to detect a motion state of the pet, generate a motion detection signal carrying the motion state, and send the motion detection signal to the master control circuit;
    the master control circuit is configured to: control, based on the motion detection signal and the position detection signal, the warning assembly to operate or stop operating in a case that the signal strength of the first signal is greater than or equal to the preset signal strength.

11. The wireless electronic fence according to claim 10, wherein the master control circuit is configured to:
    determine a posture of the pet corresponding to the motion detection signal according to a preset mapping relationship, and compare the determined posture with a preset warning posture;
    compare the position carried in the position detection signal with a preset position range; and
    control the warning assembly to operate to give a warning to the pet in a case that the determined posture matches the preset warning posture and the position is located outside the preset position range.

12. The wireless electronic fence according to claim 11, wherein the master control circuit is configured to:
determine the posture of the pet corresponding to the motion detection signal according to the preset mapping relationship, and compare the posture with the preset warning posture;
compare the position carried in the position detection signal with the preset position range; and
control the warning assembly to stop operating in a case that the determined posture does not match the preset warning posture and the position is located outside the preset position range.

13. The wireless electronic fence according to claim 9, wherein the situation determination module comprises a barking detection assembly configured to:
detect a barking amplitude of the pet; and in a case that the barking amplitude is greater than a preset amplitude, count the number of barks, generate a barking signal carrying the number of barks, and send the barking signal to the master control circuit;
wherein the master control circuit is configured to: control, based on the barking signal and the position detection signal, the warning assembly to operate or stop operating in a case that the signal strength of the first signal is greater than or equal to the preset signal strength.

14. The wireless electronic fence according to claim 13, wherein the master control circuit is configured to:
compare the position carried in the position detection signal with the preset position range;
compare the number of barks carried in the barking signal with a preset number; control the warning assembly to operate to give a warning to the pet in a case that the number of barks is less than the preset number and the position is located outside of the preset position range.

15. The wireless electronic fence according to claim 13, wherein the master control circuit is configured to:
compare the position carried in the position detection signal with the preset position range;
compare the number of barks carried in the barking signal with a preset number; control the warning assembly to stop operating in a case that the number of barks is greater than or equal to the preset number and the position is located outside the preset position range.

16. The wireless electronic fence according to claim 1, further comprising a trigger assembly and a display assembly connected to the master control circuit;
wherein the warning assembly comprises: a buzzer alarm assembly, a vibration assembly, and an electric shock assembly;
the trigger assembly comprises: a test trigger assembly, connected to the master control circuit and configured to send a test trigger signal to the master control circuit when being triggered by a user; and
the master control circuit is configured to: control, when receiving the test trigger signal, the positioning assembly, the buzzer alarm assembly, the vibration assembly and the electric shock assembly to operate.

17. The wireless electronic fence according to claim 16, wherein the trigger assembly further comprises: a first trigger member configured to output, when being triggered by the user, a first trigger signal;
the master control circuit is configured to: control, when receiving the first trigger signal, the positioning assembly to operate to detect whether the positioning assembly is operating normally.

18. The wireless electronic fence according to claim 17, wherein when the positioning component is a GPS positioning assembly, the trigger assembly further comprises: a second trigger member configured to output a second trigger signal when being triggered by the user; and
the master control circuit is configured to control, when receiving the second trigger signal, the display assembly to display the total number of positioning satellites during the positioning assembly being operating.

19. The wireless electronic fence according to claim 18, wherein when the positioning assembly is the GPS positioning assembly, the trigger assembly further comprises: a third trigger member configured to output a third trigger signal when being triggered by the user; and
the master control circuit is configured to control, when receiving the third trigger signal, the display assembly to display an average signal-to-noise ratio during the positioning assembly being operating.

\* \* \* \* \*